(12) United States Patent
Hatch et al.

(10) Patent No.: US 12,068,104 B2
(45) Date of Patent: Aug. 20, 2024

(54) SYSTEMS AND METHODS FOR ADDITIVE MANUFACTURING MAGNETIC SOLENOIDS

(71) Applicant: Honeywell Federal Manufacturing & Technologies, LLC, Kansas City, MO (US)

(72) Inventors: Jonathan Douglas Hatch, Cleveland, MO (US); Bob Dearth, Kansas City, MO (US); Ida Sanchez, Leawood, KS (US); Francisco Garcia-Moreno, Spring, TX (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/196,020

(22) Filed: May 11, 2023

(65) Prior Publication Data

US 2023/0298812 A1  Sep. 21, 2023

Related U.S. Application Data

(62) Division of application No. 17/075,265, filed on Oct. 20, 2020, now Pat. No. 11,688,550.

(51) Int. Cl.
| | |
|---|---|
| *B22F 10/00* | (2021.01) |
| *B22F 10/25* | (2021.01) |
| *B23K 26/342* | (2014.01) |
| *B33Y 10/00* | (2015.01) |
| *B33Y 30/00* | (2015.01) |
| *B33Y 40/20* | (2020.01) |
| *H01F 41/02* | (2006.01) |
| *B22F 10/10* | (2021.01) |
| *B22F 10/64* | (2021.01) |
| *B22F 10/80* | (2021.01) |
| *B22F 12/00* | (2021.01) |
| *B22F 12/10* | (2021.01) |
| *B22F 12/58* | (2021.01) |
| *B23K 101/36* | (2006.01) |
| *B23K 103/04* | (2006.01) |

(52) U.S. Cl.
CPC .............. *H01F 41/02* (2013.01); *B22F 10/00* (2021.01); *B22F 10/25* (2021.01); *B23K 26/342* (2015.10); *B33Y 10/00* (2014.12); *B33Y 30/00* (2014.12); *B33Y 40/20* (2020.01); *B22F 10/10* (2021.01); *B22F 10/64* (2021.01); *B22F 10/80* (2021.01); *B22F 12/10* (2021.01); *B22F 12/22* (2021.01); *B22F 12/58* (2021.01); *B23K 2101/36* (2018.08); *B23K 2103/04* (2018.08)

(58) Field of Classification Search
CPC .................. B23K 15/086; B28B 1/001; B22F 2003/1057
See application file for complete search history.

(56) References Cited

U.S. PATENT DOCUMENTS

| | | | | |
|---|---|---|---|---|
| 5,555,481 | A * | 9/1996 | Rock ....................... | B29C 64/40 419/45 |
| 2015/0044084 | A1* | 2/2015 | Hofmann .................. | B05D 1/18 264/642 |
| 2020/0398482 | A1* | 12/2020 | Tjellesen .............. | B29C 64/209 |

FOREIGN PATENT DOCUMENTS

WO   WO2019108719   *  6/2019

* cited by examiner

*Primary Examiner* — Nicholas A Wang
(74) *Attorney, Agent, or Firm* — Hovey Williams LLP

(57) ABSTRACT

Systems and methods for forming a magnetically-enabled part via additive manufacturing. The method includes depositing a layer of additive manufacturing material on a build plate, melting or sintering the layer of additive manufacturing material, depositing additional layers of additive manufacturing material on previous layers of additive manufacturing material, the additive manufacturing material of at least some of the additional layers being magnetically permeable, and melting or sintering the additional layers of additive manufacturing material such that the magnetically-enabled part has a transition region including at least some of the magnetically permeable additive manufacturing material.

16 Claims, 4 Drawing Sheets

SYSTEMS AND METHODS FOR ADDITIVE MANUFACTURING MAGNETIC SOLENOIDS

RELATED APPLICATIONS

This regular utility non-provisional patent application is a divisional, and claims priority benefit with regard to all common subject matter, of earlier-filed U.S. Non-Provisional patent application Ser. No. 17/075,265, filed on Oct. 20, 2020, and entitled "SYSTEMS AND METHODS FOR ADDITIVE MANUFACTURING MAGNETIC SOLENOIDS". Application Ser. No. 17/075,265 claims priority benefit with regard to all common subject matter of earlier-filed U.S. Provisional Patent Application Ser. No. 62/923,821, filed on Oct. 21, 2019, and entitled "ADDITIVE MANUFACTURING MAGNETIC SOLENOIDS". The identified earlier-filed patent applications are hereby incorporated by reference in their entireties into the present application.

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Magnetically-enabled parts typically include discrete non-magnetic structural features and discrete magnetic components. That is, the magnetic components embody basic, distinct volumes such as a disc or a wedge. The pronounced boundaries and homogenous composition of the distinct volumes restricts potential magnetic profiles of the magnetic components. Discrete structural features further inhibit or even interfere with the potential magnetic profiles of the magnetic components.

SUMMARY

Embodiments of the invention solve the above-mentioned problems and other problems and provide a distinct advancement in the art of manufacturing magnetically-enabled parts. More particularly, the invention provides systems and methods for additively manufacturing a magnetically-enabled part via magnetically permeable material. The magnetically permeable material may be concentrated in selected areas via transition regions to form a magnetically-enabled part having virtually any magnetic profile.

The invention allows for topology optimization in a design phase for magnetically-enabled parts. Specifically, non-structural material and non-magnetic flux paths can be removed from a part's geometry, resulting in a lower-mass design. The part may be built via additive manufacturing with the lower-mass design and still have comparable magnetic performance and strength. Similarly, magnetic performance may be improved or predictable and desirable assembly-level torque curves may be realized. Furthermore, magnetic topology optimization can be reversed to provide a given geometry (unique envelopes or unusual geometries), with design iterations being performed within those bounds to achieve desirable or predictable magnetic and mechanical performance.

An embodiment of the invention is an additive manufacturing system broadly comprising a frame, a build plate, a first additive manufacturing material reserve, a second additive manufacturing material reserve, a feeder, an additive manufacturing material deposition device, a directed energy source, a set of motors, a processor, and a heat-treatment device.

The frame provides structure for the build plate, feeder, directed energy source, and motors and includes a base, vertical members, cross members, and mounting points for mounting the above components thereto.

The build plate may be a stationary or movable flat tray or bed, a substrate, a mandrel, a wheel, scaffolding, or similar support. The build plate may be made of a dense stainless steel or other material similar to the first additive manufacturing material.

The additive manufacturing material reserves are substantially similar and each retains one of the additive manufacturing materials. Each additive manufacturing material reserve may be a hopper, tank, cartridge, container, spool, or other similar material holder.

The first additive manufacturing material may be a high strength steel, such as stainless steel, or other structural material. The first additive manufacturing material may be a powder, a filament, or any other suitable form.

The second additive manufacturing material may be a magnetically permeable material such as Hiperco®. The second additive manufacturing material may be a powder, an ink or other liquid, or any other suitable form.

The feeder may be a pump, an auger, or any other suitable feeder. Alternatively, the first additive manufacturing material and the second additive manufacturing material may be gravity fed to the additive manufacturing material deposition device.

The additive manufacturing material deposition device may include a nozzle, guide, sprayer, rake, or other similar component. The additive manufacturing material deposition device deposits the additive manufacturing material onto the build plate and previously constructed layers.

The directed energy source may be a laser, heater, or similar component for melting the first and second additive manufacturing materials and bonding (e.g., selective laser sintering (SLS) or selective laser melting (SLM)) the first and second additive manufacturing materials to a previously constructed layer. The directed energy source may be configured to melt the first and second additive manufacturing materials as they are deposited or melt the material of an entire layer after the layer has been deposited.

The motors position the additive manufacturing material deposition device over the build plate and previously constructed layers and move the additive manufacturing material deposition device as the first and second additive manufacturing materials are deposited onto at least one of the build plate and the previously constructed layers.

The processor directs the additive manufacturing material deposition device via the motors and activates the additive manufacturing material deposition device such that the additive manufacturing material deposition device deposits the additive manufacturing materials onto the build plate and previously constructed layers according to a computer aided design of the magnetically-enabled part. The processor may include at least one of a circuit board, memory, display, inputs, and other electronic components such as a transceiver or external connection for communicating with other external computers.

The heat-treatment device is configured to heat-treat the magnetically-enabled part on or off the build plate. The heat-treatment device may be an oven, a furnace, a heating element, or any other suitable heat-treatment device.

In use, the additive manufacturing system may deposit the first additive manufacturing material onto at least one of the build plate and previously constructed layers. The directed energy source may melt or sinter the first additive manufacturing material of the current layer. In this way, a base region formed of several layers of the first additive manufacturing material is built up on the build plate to a critical point in the geometry of the part.

Once the base region is completed, a mixture, combination, or alternating pattern of the first additive manufacturing material and the second additive manufacturing material may be deposited onto the previously constructed layers to form a transition region. The specific location and placement of the mixture, combination, or alternating pattern may be according to computer-aided design (CAD) data, or other technical model or drawing, as followed manually or by a user or as directed in an automated or semi-automated fashion. The directed energy source may then melt or sinter the mixture, combination, or alternating pattern of the current layer.

The transition region may include a predetermined number of layers at a known height and may be triggered by automated feed, calculated mass consumed, or other similar mechanisms. The transition region may occur multiple times and may be dependent on several factors such as build orientation, materials, and automatically changing parameters for each material. The transition region may also incorporate two, three, or more materials. In another embodiment, a series of transition regions may occur between subsequent materials (i.e., a first transition region between first and second materials followed by a second transition region between second and third materials).

Once the transition region is completed, only the second additive manufacturing material 104 may be deposited onto the previously constructed layers. The specific location and placement of the second additive manufacturing material 104 may be according to computer-aided design (CAD) data, or other technical model or drawing, as followed manually or by a user or as directed in an automated or semi-automated fashion. The directed energy source may then melt or sinter the second additive manufacturing material of the current layer.

The magnetically-enabled part may then be heat-treated via the heat-treatment device. To that end, the magnetically-enabled part may be heat-treated on the build plate or after being removed from the build plate.

The above-described invention provides several advantages. For example, magnetically permeable material may be used via additive manufacturing to create magnetically critical geometries otherwise impossible to machine via conventional manufacturing techniques. The magnetically-enabled part may be designed within unique design envelopes or with unusual geometries that may impact magnetic, electrical, or mechanical performance. The magnetically-enabled part may also include transition regions between materials to combine or merge different material properties within the magnetically-enabled part. Additive manufacturing also improves the turn-around time for development cycles, enabling faster design iterations and allowing additional time for application testing. Embodiments of the present invention may be used for Alternating Current (AC) and Direct Current (DC) applications and any magnetic and electro-mechanical devices.

The above-described system and method incorporate software optimization, geometric optimization, or topology optimization of magnetically-enabled designs previously unachievable with conventional manufacturing. The present invention also enables a reduction of mass for obtaining equivalent magnetic, electrical, or mechanical properties.

BRIEF DESCRIPTION OF THE DRAWING FIGURES

Embodiments of the present invention are described in detail below with reference to the attached drawing figures, wherein.

Figure 1:
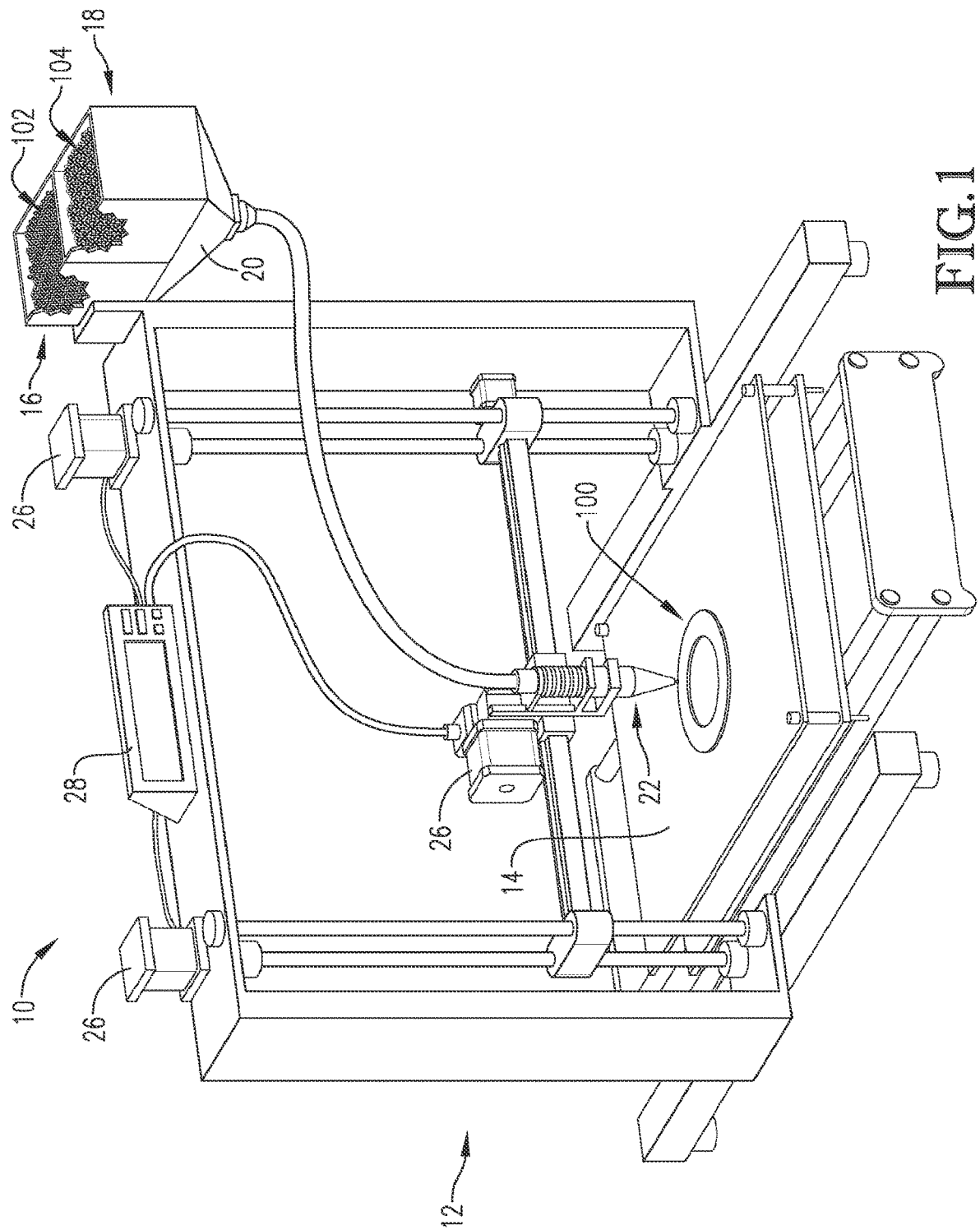
FIG. 1 is a perspective view of an additive manufacturing system constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated or except as will be readily apparent to those skilled in the art from the description. For example, a feature, structure, act, etc. described in one embodiment may also be included in other embodiments, but is not necessarily included. Thus, the current technology can include a variety of combinations or integrations of the embodiments described herein.

Broadly characterized, the present invention includes a system and method for additively manufacturing a magnetically-enabled part via magnetically permeable material. The magnetically permeable material may be concentrated in selected areas via transition regions such that the magnetically-enabled part exhibits bi-metallic or bi-material properties. This allows the magnetically-enabled part to have virtually any magnetic profile. That is, the systems and methods described herein enable the production of parts within unique design envelopes or with unusual geometries that impact magnetic and mechanical performance. The magnetically-enabled part may be a solenoid, a rotor, a stator, or any other suitable magnetically-enabled or electromechanical component.

The invention allows for topology optimization in a design phase for magnetically-enabled parts. Specifically, non-structural material and non-magnetic flux paths can be removed from a part's geometry, resulting in a lower-mass design. The part may be built via additive manufacturing with the lower-mass design and still have comparable magnetic performance and strength. Similarly, magnetic performance may be improved or predictable and desirable assembly-level torque curves may be realized. Furthermore, magnetic topology optimization can be reversed to provide a given geometry (unique envelopes or unusual geometries), with design iterations being performed within those bounds to achieve desirable or predictable magnetic and mechanical performance.

Figure 2:
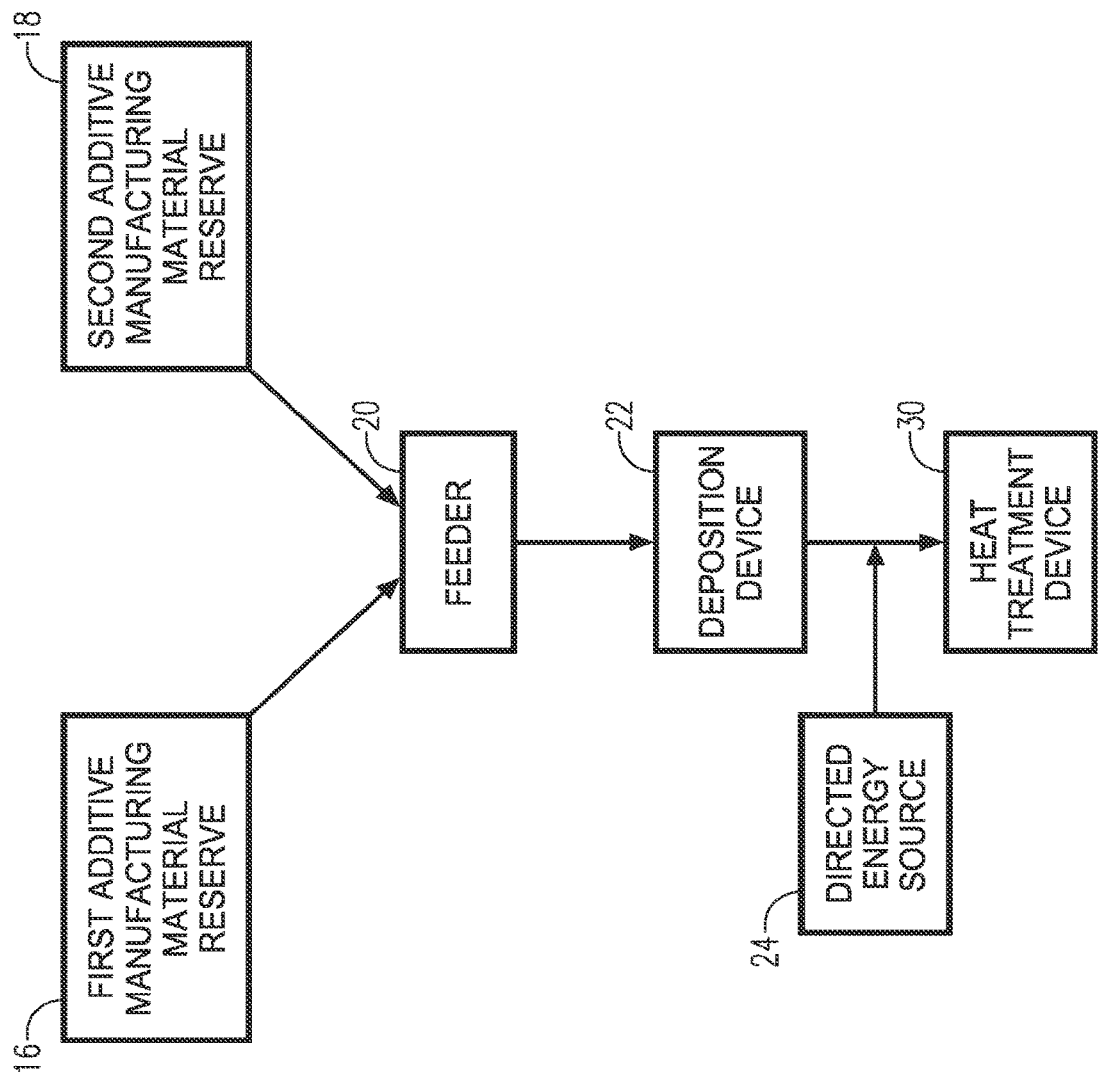
FIG. 2 is a schematic diagram of components of the additive manufacturing system of FIG. 1.
Figure 3:
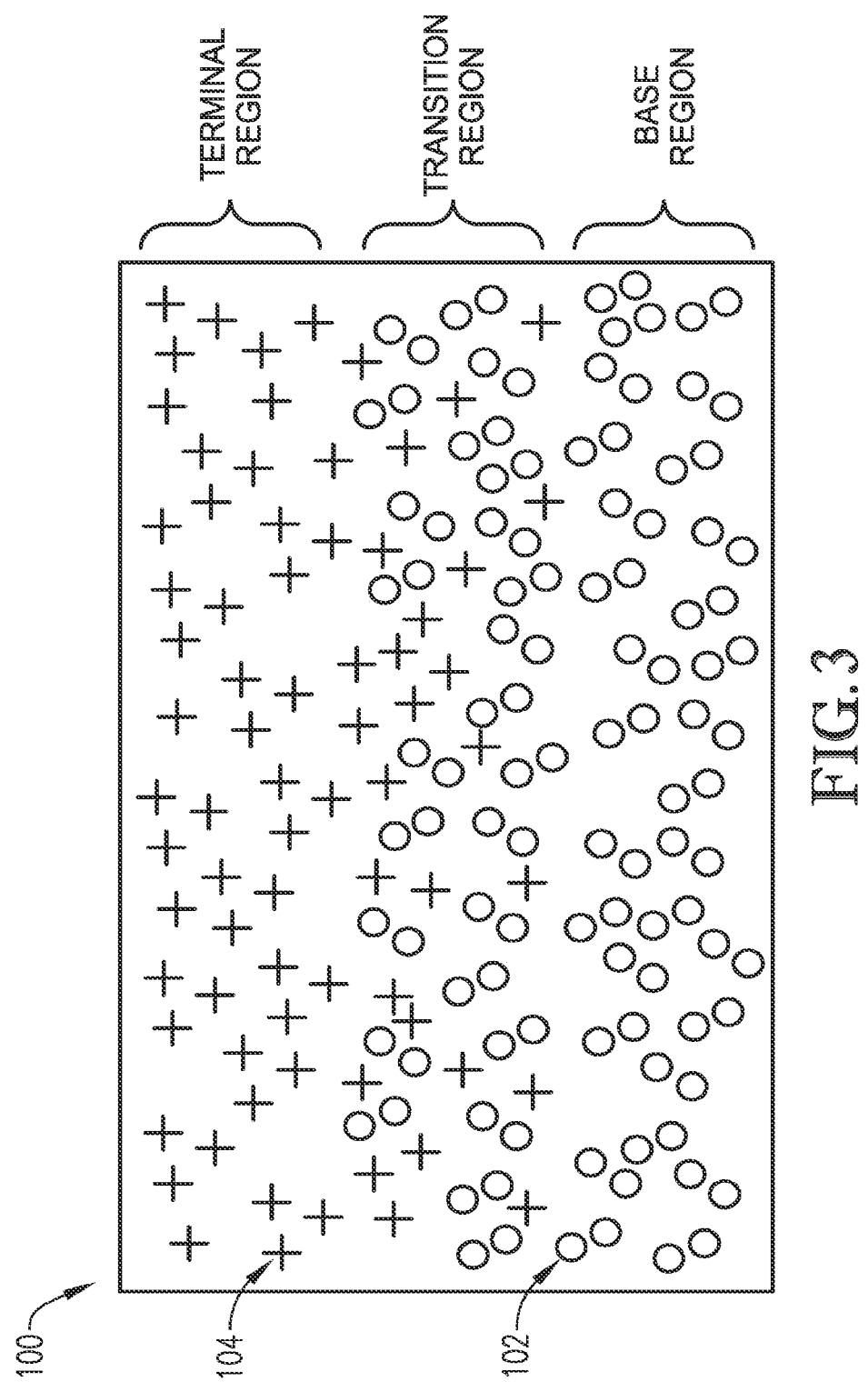
FIG. 3 is a cross section of an electromagnetic part formed via the additive manufacturing system in accordance with an embodiment of the invention.

Turning to FIGS. 1-3, an additive manufacturing system 10 constructed in accordance with an embodiment of the present invention is illustrated. The additive manufacturing system 10 broadly comprises a frame 12, a build plate 14, a first additive manufacturing material reserve 16, a second additive manufacturing material reserve 18, a feeder 20, an additive manufacturing material deposition device 22, a directed energy source 24, a set of motors 26, a processor 28, and a heat-treatment device 30.

The frame 12 provides structure for the build plate 14, feeder 20, directed energy source 24, and motors 26 and may include a base, vertical members, cross members, and mounting points for mounting the above components thereto. Alternatively, the frame 12 may be a walled housing or similar structure.

The build plate 14 may be a stationary or movable flat tray or bed, a substrate, a mandrel, a wheel, scaffolding, or similar support. The build plate 14 may be made of a dense stainless steel or other material similar to the first additive manufacturing material 102. The build plate 14 may be integral with the additive manufacturing system 10 or may be removable and integral with an magnetically-enabled part 100 being formed (as discussed in more detail below).

The first additive manufacturing material reserve 16 retains the first additive manufacturing material 102 and may be a hopper, tank, cartridge, container, spool, or other similar material holder. The first additive manufacturing material reserve 16 may be integral with the additive manufacturing system 10 or may be at least one of disposable and reusable.

The first additive manufacturing material 102 may be a high strength steel, such as stainless steel, or other structural material. The first additive manufacturing material 104 may be a powder, a filament, or any other suitable form.

The second additive manufacturing material reserve 18 retains the second additive manufacturing material 104 and may be a hopper, tank, cartridge, container, spool, or other similar material holder. The second additive manufacturing material reserve 18 may be integral with the additive manufacturing system 10 or may be at least one of disposable and reusable.

The second additive manufacturing material 104 may be a magnetically permeable material such as Hiperco®. The second additive manufacturing material 104 may be a powder, an ink or other liquid, or any other suitable form.

The feeder 20 may be a pump, an auger, or any other suitable feeder. Alternatively, the first additive manufacturing material 102 and the second additive manufacturing material 104 may be gravity fed to the additive manufacturing material deposition device 22. The feeder 20 connects to both additive manufacturing material reserves 16, 18 and may mix the first and second additive manufacturing materials 102, 104 together in any mixture percentage by weight, volume, or any other suitable metric.

The additive manufacturing material deposition device 22 may include a nozzle, guide, sprayer, rake, or other similar component for depositing the additive manufacturing material 104 onto the build plate 14 and previously constructed layers.

The directed energy source 24 may be a laser, heater, or similar component for melting the first additive manufacturing material 102 and the second additive manufacturing material 104 and bonding (e.g., selective laser sintering (SLS) or selective laser melting (SLM)) the first additive manufacturing material 102 and the second additive manufacturing material 104 to a previously constructed layer. The directed energy source 24 may be configured to melt the first additive manufacturing material 102 and the second additive manufacturing material 104 as it is being deposited or melt the material of an entire layer after the layer has been deposited.

The motors 26 position the additive manufacturing material deposition device 22 over the build plate 14 and previously constructed layers and move the additive manufacturing material deposition device 22 as at least one of the first additive manufacturing material 102 and the second additive manufacturing material 104 are deposited onto at least one of the build plate 14 and the previously constructed layers. The motors 26 may be oriented orthogonally to each other so that a first one of the motors 26 is configured to move the additive manufacturing material deposition device 22 in a lateral "x" direction, a second one of the motors 26 is configured to move the additive manufacturing material deposition device 22 in a longitudinal "y" direction, and a third one of the motors 26 is configured to move the additive manufacturing material deposition device 22 in an altitudinal "z" direction. Alternatively, the motors 26 may move the build plate 14 (and hence the magnetically-enabled part 100) while the additive manufacturing material deposition device 22 remains stationary.

The processor 28 directs the additive manufacturing material deposition device 22 via the motors 26 and activates the additive manufacturing material deposition device 22 such that the additive manufacturing material deposition device 22 deposits the additive manufacturing material 104 onto the build plate 14 and previously constructed layers according to a computer aided design of the magnetically-enabled part 100. The processor 28 may include at least one of a circuit board, memory, display, inputs, and other electronic components such as a transceiver or external connection for communicating with other external computers.

The processor 28 may implement aspects of the present invention with one or more computer programs stored in or on computer-readable medium residing on or accessible by the processor. Each computer program preferably comprises an ordered listing of executable instructions for implementing logical functions in the processor 28. Each computer program can be embodied in any non-transitory computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any non-transitory means that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The heat-treatment device 30 is configured to heat-treat the magnetically-enabled part on or off the build plate 14. The heat-treatment device 30 may be an oven, a furnace, a heating element, or any other suitable heat-treatment device.

Figure 4:
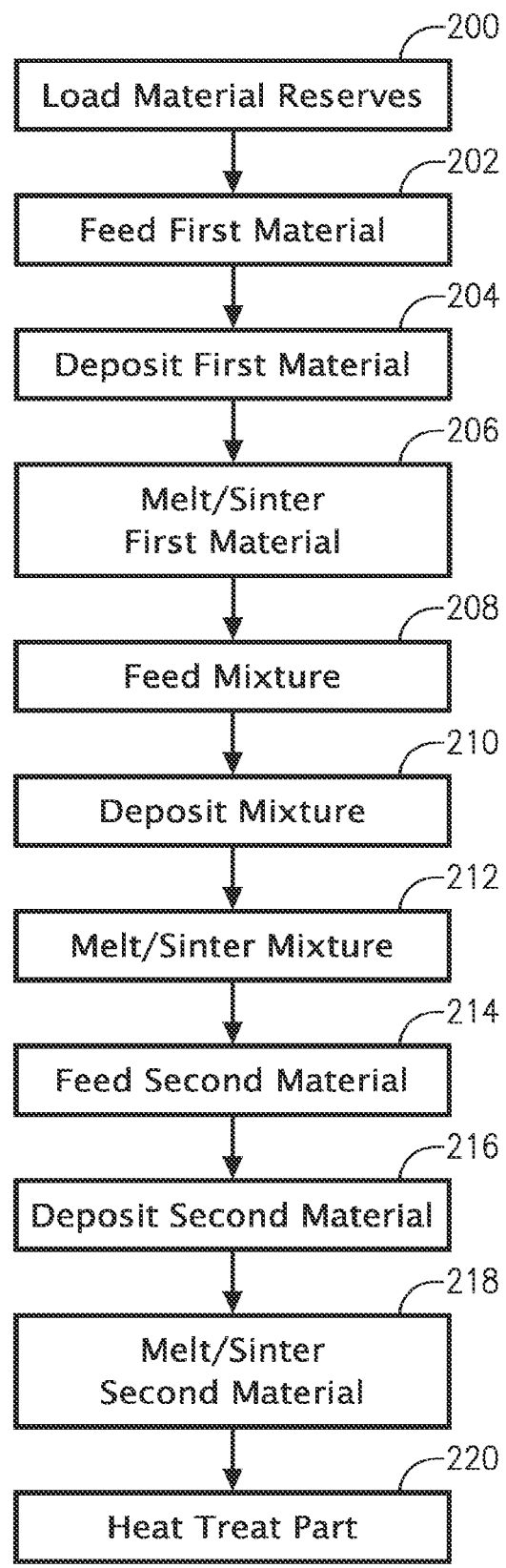
FIG. 4 is a flow diagram showing certain steps of a method of additive manufacturing the electromagnetic part of FIG. 3 in accordance with another embodiment of the invention.

Turning to FIG. 4, and with reference to FIGS. 1-3, use of the additive manufacturing system 10 will now be described in more detail. First, the first additive manufacturing material 102 may be positioned in the first additive manufacturing material reserve 16 and the second additive manufacturing material 104 may be positioned in the second additive manufacturing material reserve 18, as shown in block 200.

The first additive manufacturing material 102 may then be fed to the additive manufacturing material deposition device 22 via the feeder 20, as shown in block 202. The additive manufacturing material 104 may be metered in discrete amounts or continuously, depending on movement and position of the material mixture deposition device 28.

The additive manufacturing material deposition device 22 may then deposit the first additive manufacturing material 102 onto at least one of the build plate 14 and previously constructed layers, as shown in block 204. The specific location and placement of the additive manufacturing material 104 may be according to computer-aided design (CAD) data, or other technical model or drawing, as followed manually or by a user or as directed in an automated or semi-automated fashion via control signals provided from the processor 28 to the motors 26.

The directed energy source 24 may then melt or sinter the first additive manufacturing material 102 of the current layer, as shown in block 206. This may include tracing the directed energy source 24 over or through the current layer according to CAD data, models, drawings, or other technical resources. The first additive manufacturing material 102 may fuse together. Alternatively or additionally, the first additive manufacturing material 102 may fuse to additive manufacturing material of a previous layer.

Steps 202-206 may be repeated multiple times as needed. For example, once one layer of the magnetically-enabled part 100 has been fused, another layer of the first additive manufacturing material 102 may be deposited. This may be accomplished through first lowering the build plate 14 relative to the material mixture deposition device 22 and directed energy source 24. In this way, a base region formed of several layers of the first additive manufacturing material 102 is built up on the build plate 14 to a critical point in the geometry of the part 100. The base region may include geometries needing high strength (e.g., threaded holes, standoffs, bosses, locating holes, and the like). To that end, the base region may include at least a portion of the build plate 14 or other pre-manufactured components or features.

Once the base region is completed, a mixture, combination, or alternating pattern of the first additive manufacturing material 102 and the second additive manufacturing material 104 may be fed to the additive manufacturing material deposition device 22 via the feeder 20, as shown in block 208. The mixture, combination, or pattern may be metered in discrete amounts or continuously, depending on movement and position of the material mixture deposition device 28.

The additive manufacturing material deposition device 22 may then deposit the mixture, combination, or alternating pattern onto the previously constructed layers to form a transition region, as shown in block 210. The specific location and placement of the mixture, combination, or alternating pattern may be according to computer-aided design (CAD) data, or other technical model or drawing, as followed manually or by a user or as directed in an automated or semi-automated fashion via control signals provided from the processor 28 to the motors 26.

The directed energy source 24 may then melt or sinter the mixture, combination, or alternating pattern of the current layer, as shown in block 212. This may include tracing the directed energy source 24 over or through the current layer according to CAD data, models, drawings, or other technical resources. The mixture, combination, or alternative pattern may fuse together. Alternatively or additionally, the mixture, combination, or alternative pattern may fuse to additive manufacturing material of a previous layer.

Steps 208-212 may be repeated multiple times as needed. The transition region may include a predetermined number of layers at a known height and may be triggered by automated feed, calculated mass consumed, or other similar mechanisms. The transition region may include a predetermined transition gradient from the first additive manufacturing material 102 to the second additive manufacturing material 104. The transition gradient may be linear, sinusoidal, exponential, stepped, or any other suitable gradient.

The transition region may occur multiple times and may be dependent on several factors such as build orientation, materials, and automatically changing parameters for each material. The transition region may also incorporate two, three, or more materials. In another embodiment, a series of transition regions may occur between subsequent materials (i.e., a first transition region between first and second materials followed by a second transition region between second and third materials).

Once the transition region is completed, only the second additive manufacturing material 104 may be fed to the additive manufacturing material deposition device 22 via the feeder 20, as shown in block 214. The second additive manufacturing material 104 may be metered in discrete amounts or continuously, depending on movement and position of the material mixture deposition device 28.

The additive manufacturing material deposition device 22 may then deposit the second additive manufacturing material 104 onto the previously constructed layers, as shown in block 216. The specific location and placement of the second additive manufacturing material 104 may be according to computer-aided design (CAD) data, or other technical model or drawing, as followed manually or by a user or as directed in an automated or semi-automated fashion via control signals provided from the processor 28 to the motors 26.

The directed energy source 24 may then melt or sinter the second additive manufacturing material 104 of the current layer, as shown in block 218. This may include tracing the directed energy source 24 over or through the current layer according to CAD data, models, drawings, or other technical resources. The second additive manufacturing material 104 may fuse together. Alternatively or additionally, the second additive manufacturing material 104 may fuse to additive manufacturing material of a previous layer. Steps 214-218 may be repeated multiple times as needed.

In some embodiments, an additional layer of the first additive manufacturing material 102 or an additional transition region may then be added. That is, a region made of only one additive manufacturing material may be flanked on both sides by transition regions or any other combination of materials such as homogenous regions of the same or different materials. Similarly, a transition region may be flanked by homogeneous regions of the same or different materials or transition regions including other materials. In this way, material gradients may have virtually any suitable pattern. This allows for the magnetically-enabled part 100 to have virtually any distribution of magnetic, electrical, or mechanical properties for specific applications.

The magnetically-enabled part 100 may then be heat-treated via the heat-treatment device 30, as shown in block 220. To that end, the magnetically-enabled part 100 may be heat-treated on the build plate 14 or after being removed from the build plate 14.

In one embodiment, the magnetically-enabled part 100 may include at least a portion of the build plate 14 itself. The build plate 14 could serve as the base region or a portion thereof and may be machined to include some of the desired base geometries of the magnetically-enabled part 100. For example, the magnetically-enabled part 100 may include a stainless steel bar formed by the build plate 14, a transition region including less dense stainless steel and some magnetically permeable material, and a terminal region including only magnetically permeable material. This could also be reversed or reordered as desired.

The above-described invention provides several advantages. For example, magnetically permeable material may be used via additive manufacturing to create magnetically critical geometries otherwise impossible to machine via conventional manufacturing techniques. The magnetically-enabled part 100 may be designed within unique design envelopes or with unusual geometries that may impact magnetic, electrical, or mechanical performance. The magnetically-enabled part 100 may also include transition regions between materials to combine or merge different material properties within the magnetically-enabled part 100. Additive manufacturing also improves the turn-around time for development cycles, enabling faster design iterations and allowing additional time for application testing. Embodiments of the present invention may be used for Alternating Current (AC) and Direct Current (DC) applications and any magnetic and electro-mechanical devices.

The above-described system and method incorporate software optimization, geometric optimization, or topology optimization of magnetically-enabled designs previously unachievable with conventional manufacturing, which may be used to improve a magnetic profile, a mechanical characteristic, or other characteristics of the magnetically-enabled part. The present invention also enables a reduction of mass for obtaining equivalent magnetic, electrical, or mechanical properties.

The present invention eliminates brittleness issues from which non-heat treated magnetically permeable materials suffer. Components formed of such materials do not have enough strength for mounting within stronglinks in extreme environments.

The above-described steps may be performed in any order, including simultaneously. In addition, some of the steps may be at least one of repeated, duplicated, and omitted without departing from the scope of the present invention.

Although the invention has been described with reference to the embodiments illustrated in the attached drawing figures, it is noted that equivalents may be employed and substitutions made herein without departing from the scope of the invention.

Having thus described various embodiments of the invention, what is claimed as new and desired to be protected by Letters Patent includes the following:

1. An additive manufacturing system for forming a magnetically-enabled part, the additive manufacturing system comprising:
a build plate;
a material deposition device configured to:
deposit a first plurality of layers of a first additive manufacturing material on the build plate so as to form a base region;
deposit a second plurality of layers of the first additive manufacturing material and a second additive manufacturing material on the first plurality of layers so as to form a transition region; and
deposit a third plurality of layers of the second additive manufacturing material on the second plurality of layers so as to form a terminal region;
a processor configured to:
calculate a mass consumed as the first plurality of layers is being deposited; and
trigger deposition of the second plurality of layers according to a predetermined amount of mass consumed;
a directed energy source configured to melt or sinter the first plurality of layers, the second plurality of layers, and the third plurality of layers,
the additive manufacturing material of at least some of the layers being magnetically permeable such that the transition region includes at least some of the magnetically permeable additive manufacturing material.

2. The additive manufacturing system of claim 1, the processor being further configured to alter a topology of the magnetically permeable additive manufacturing material.

3. The additive manufacturing system of claim 1, further comprising a heat-treatment device configured to heat-treat the magnetically-enabled part on the build plate.

4. The additive manufacturing system of claim 1, the material deposition device being further configured to meter the first additive manufacturing material and the second additive manufacturing material depending on movement and a position of the material deposition device.

5. The additive manufacturing system of claim 1, the material deposition device being configured to deposit subsequent layers of additive manufacturing material to form at least two transition regions.

6. The additive manufacturing system of claim 1, the transition region being dependent on at least one of build orientation, material type, and material parameters.

7. The additive manufacturing system of claim 1, the transition region incorporating at least three materials.

8. The additive manufacturing system of claim 1, the material deposition device being further configured to alternate deposition of the first additive manufacturing material and the second additive manufacturing material to form the transition region.

9. The additive manufacturing system of claim 1, wherein the build plate forms at least a portion of the base region.

10. An additive manufacturing system for forming an electro-mechanical part, the additive manufacturing system comprising:

a build plate;
a material deposition device configured to:
- deposit a first plurality of layers of a first additive manufacturing material on the build plate so as to form a base region;
- deposit a second plurality of layers of the first additive manufacturing material and a second additive manufacturing material on the first plurality of layers so as to form a transition region, the second additive manufacturing material being magnetically permeable; and
- deposit a third plurality of layers of the second additive manufacturing material on the second plurality of layers so as to form a terminal region;

a processor configured to:
- calculate a mass consumed as the first plurality of layers is being deposited; and
- trigger deposition of the second plurality of layers according to a predetermined amount of mass consumed;

a directed energy source configured to melt or sinter the first plurality of layers, the second plurality of layers, and the third plurality of layers, the electro-mechanical part having bi-material properties.

11. The additive manufacturing system of claim 10, the processor being further configured to alter a topology of the magnetically permeable additive manufacturing material.

12. The additive manufacturing system of claim 10, further comprising a heat-treatment device configured to heat-treat the electro-mechanical part on the build plate.

13. The additive manufacturing system of claim 10, the material deposition device being further configured to meter the first additive manufacturing material and the second additive manufacturing material depending on movement and a position of the material deposition device.

14. The additive manufacturing system of claim 10, the material deposition device being configured to deposit subsequent layers of additive manufacturing material to form at least two transition regions.

15. The additive manufacturing system of claim 10, the transition region being dependent on at least one of build orientation, material type, and material parameters.

16. The additive manufacturing system of claim 10, the material deposition device being further configured to alternate deposition of the first additive manufacturing material and the second additive manufacturing material to form the transition region.

* * * * *